Oct. 11, 1927.

A. MANSFIELD

ADJUSTABLE SAWING MACHINE

Filed June 18, 1925

INVENTOR.
Arthur Mansfield.
BY
Watson E. Coleman ATTORNEY

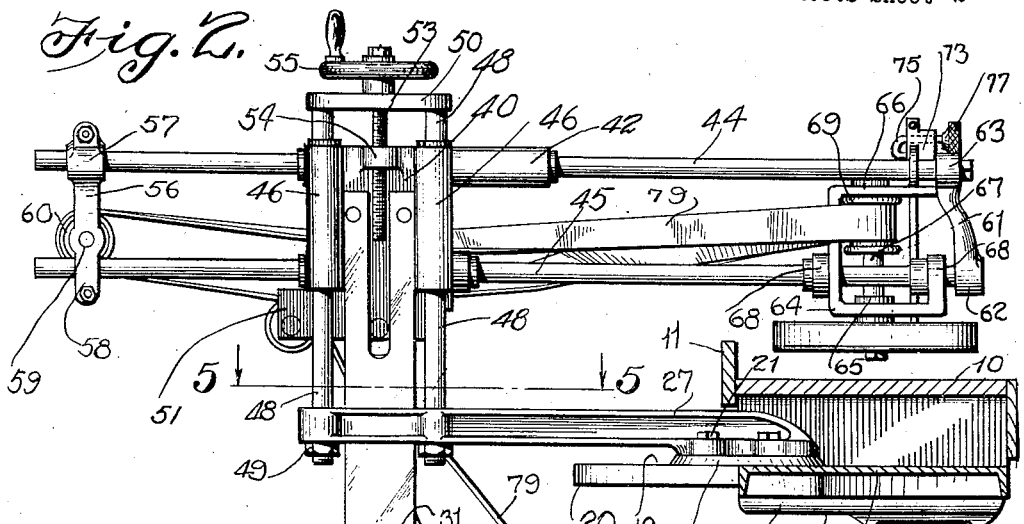

Oct. 11, 1927.
A. MANSFIELD
1,644,887
ADJUSTABLE SAWING MACHINE
Filed June 18, 1925  3 Sheets-Sheet 3
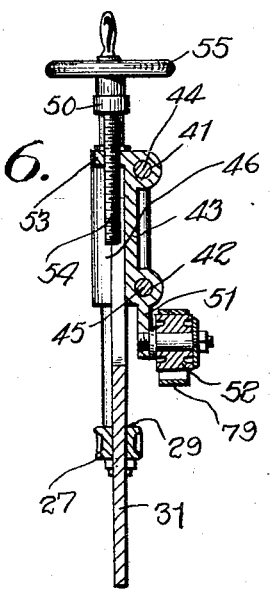
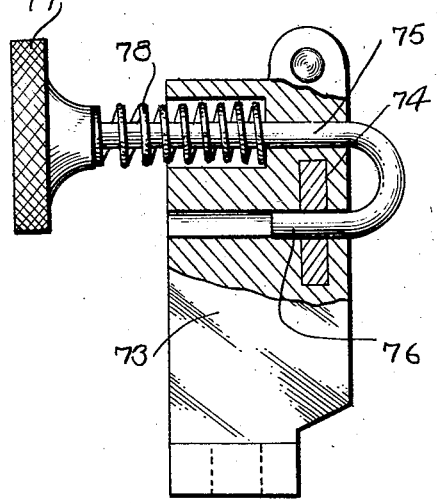
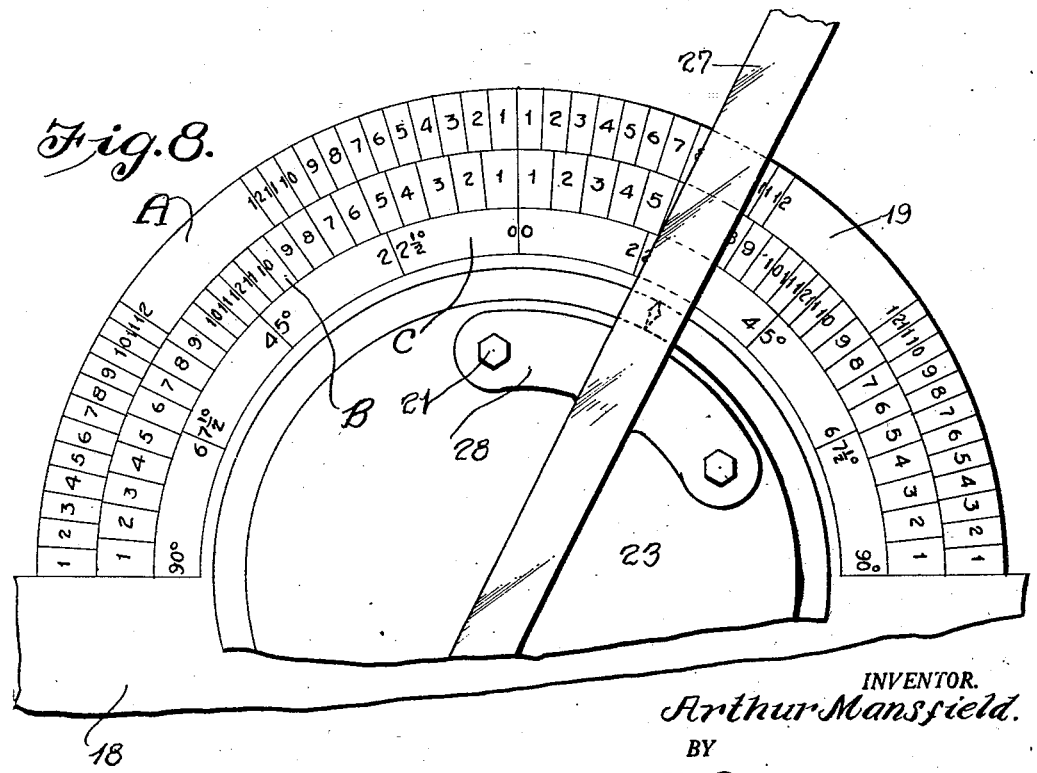
INVENTOR.
Arthur Mansfield.
BY
Watson E. Coleman
ATTORNEYS.

Patented Oct. 11, 1927.

1,644,887

UNITED STATES PATENT OFFICE.

ARTHUR MANSFIELD, OF EUREKA, KANSAS.

ADJUSTABLE SAWING MACHINE.

Application filed June 18, 1925. Serial No. 38,039.

This invention relates to sawing machines, and particularly to motor operated saws designed to be used in connection with a work table for the purpose of cutting boards, beams and for accomplishing other mill work.

One of the objects of the present invention is to provide a very simply mounted, easily handled and easily adjusted motor driven sawing machine in which the saw is so mounted that a cut at right angles to the timber may be made or a cut at any desired angle less than a right angle may be made.

A further object in this connection is to provide a saw of this character wherein the saw is adjustable so as to carry the saw into planes at right angles to or at an acute angle to the plane of the work table in connection with which the saw operates, and in this connection to provide means whereby the saw mandrel may be turned into a vertical position, if desired, to thus permit a saw to be mounted entirely in a horizontal plane if necessary or to provide the saw mandrel with a router.

A still further object of the invention is to provide a saw mounting so constructed that the saw may be reciprocated by hand across the face of the table either at right angles thereto or in a plane at an angle to the face of the table, this mounting being further so constructed that the saw may be reciprocated across the face of the table either at right angles to the side edges of the table or at less than a right angle thereto and the saw adjusted vertically to suit any thickness of work.

Another object is to provide means whereby the saw may be readily driven by motor without regard to the position of the saw.

Still another and most important object is to provide means whereby the saw may be adjusted either at an angle to the side edges of the table or at an angle to the face of the table or both, which means embodies the use of two quadrants, these quadrants having thereon the scale graduations such as are found on the steel squares commonly used for cutting roof rafters and other carpentry work of this character, the graduations being such that the system of figures present on the steel squares commonly used for the purpose stated above are transferred to these quadrants so that the saw may be shifted to any angle from 0 to 90° either right or left and may also be swung from a vertical to a horizontal position, thus permitting the saw to cut at two angles, the quadrants thus used indicating all the cuts used in making roof rafters or other complicated cuts and making it possible to cut any angle that could be marked on the timber, it being understood, of course, that a machine so constructed as to cut any rafter cut will practically cut anything else.

A further object is to so mount the saw that when cutting vertically the saw just touches the top of the table and that when the saw is swung 45° horizontally the saw still just touches the top of the table.

A still further object is to so construct the machine that a change in the angular adjustment of the saw may be made while the saw is either running or standing still.

A still further object is to mount the motor upon a saw supporting member and disposed below the table over which the saw operates to thereby prevent the vibrations of the motor from being communicated to the saw, prevent the weight of the motor from causing any sagging of the saw supports from a true horizontal position, and further to so arrange the motor and the belt driving the saw that when the motor rotates in a direction to drive the saw in the proper direction, movement of the belt will have a tendency to retract the saw in contradistinction to project the saw.

Other objects will appear in the course of the following description.

My invention is illustrated in the accompanying drawings, wherein:—

Figure 2 is a like view to Figure 1 but looking at the other side of the sawing machine from that shown in Figure 1;

Figure 5 is a section on the line 5—5 of Figure 2;

Figure 6 is a section on the line 6—6 of Figure 2;

Figure 7 is an elevation of the quadrant engaging latch mechanism, the supporting body being partly broken away and the quadrant being in section;

Figure 8 is a diagrammatic view showing the manner in which the turntable and its bed are graduated, showing the saw supporting arm 27 shifted into angular relation to the longitudinal axis of the table;

Figure 9 is a fragmentary section through the bed on the line 9—9 of Figure 1;

Figure 10 is a top plan view of the turntable 23, showing the grooves in the under face of the turntable in dotted lines;

Figure 11 is a section on the line 11—11 of Figure 10;

Figure 12 is a sectional view through the arm 27, showing the manner in which one of the members 48 engages said arm.

Figure 1:
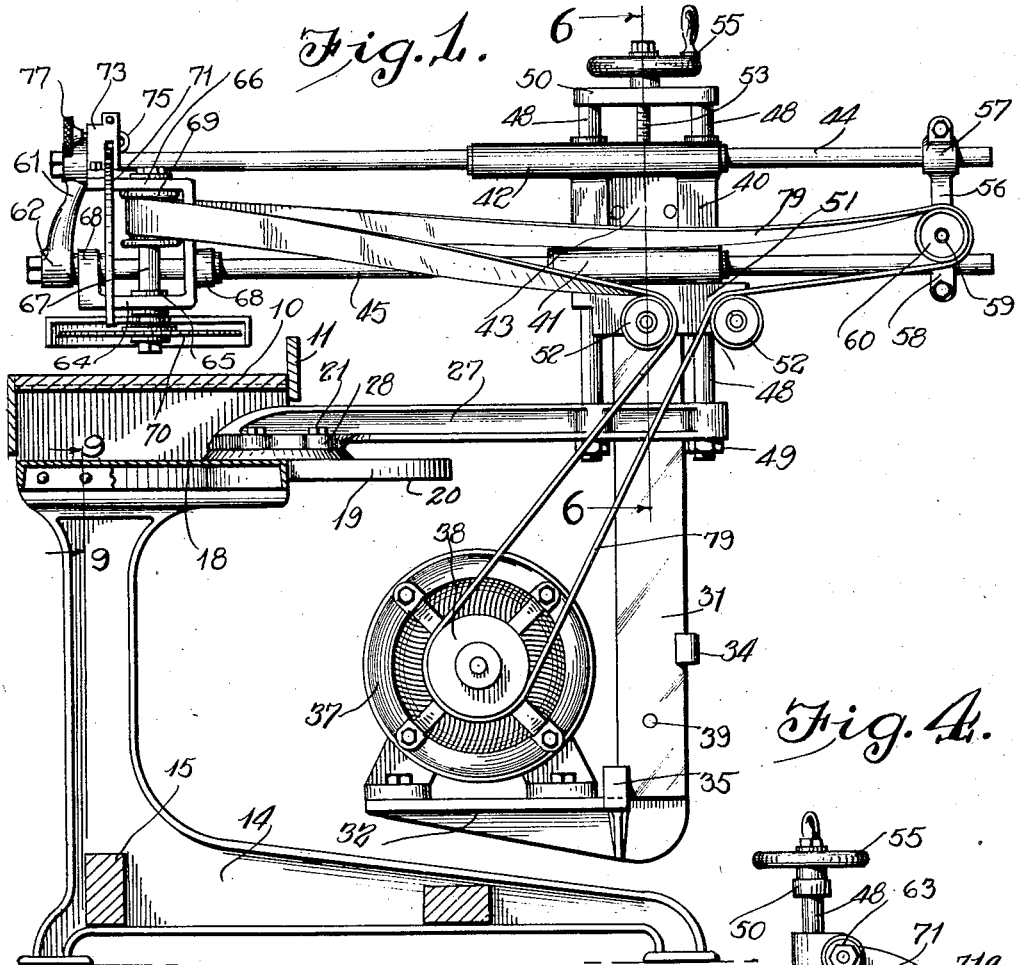
Figure 1 is a fragmentary side elevation of a sawing machine constructed in accordance with my invention, the table being in section.
Figure 3:
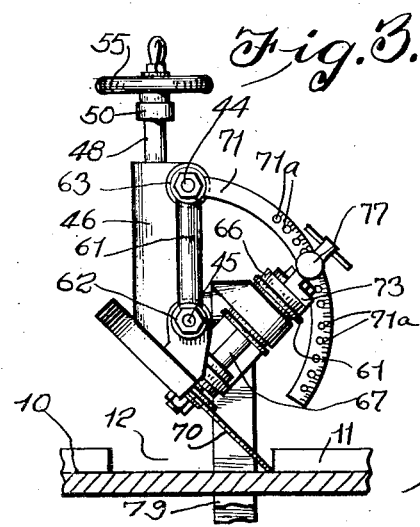
Figure 3 is a vertical longitudinal section of the table showing the sawing mechanism in elevation and the saw tilted at an angle to the table.
Figure 4:
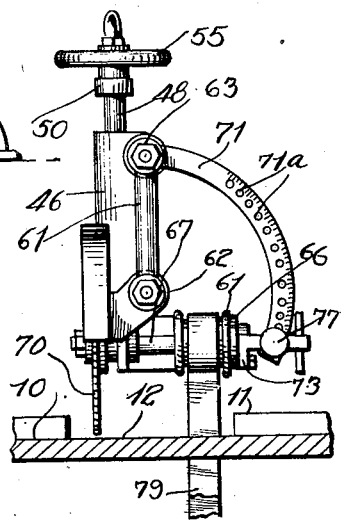
Figure 4 is a like view to Figure 3 but with the saw vertical.

Referring to these drawings, it will be seen that my construction embodies a table 10 having a guide ledge 11 along one side edge thereof, this ledge being cut out, as at 12. The table is supported in any suitable manner, but in addition to any ordinary supports for the table there are provided the legs 13, these legs extending downward and at their lower ends carrying the horizontally extending feet 14 which rest upon the floor and are connected by bracing beams 15. The upper end of each leg is laterally extended, as at 16, and provided with a flange 17, and resting upon this flange is a bed plate 18. This bed plate is bolted to the portions 16. The body of the bed plate is rectangular in form, as shown most clearly in Figure 2, but it has a semi-circular portion 19 projecting out therefrom which is formed with a downwardly extending flange 20.

Supported upon this bed plate and rotating around the axis 22 is a turntable 23 in the form of a disk having a beveled perimeter, this disk being formed upon its under face with a circular groove 24 T-shaped in cross section, there being a tangential groove or extension 25 extending from one point of the circular groove 24 outward to the rim of the disk. Coacting with this T-shaped groove 24 are two headed bolts 26 which project upward from the bed plate and enter this T-shaped groove at diametrically opposite points thereof, the heads of these bolts riding in this groove and permitting the rotation of the disk or turntable 23.

Attached to the disk 23 is an arm 27, the inner end of this arm being provided with four outwardly projecting lugs 28 perforated for the passage of screws or bolts 21 whereby this arm may be attached to the turntable or disk 23. This arm at its outer end is formed with a longitudinally extending slot 29 and slightly beyond each end of this slot the arm is vertically perforated, as at 30 (see Figure 1). Extending vertically through the slot 29 is a guide bar 31, and engaged with the lower end of this guide bar is a motor supporting bracket 32 which has a web 33 adapted to fit flat against one face of the the member 31 and is formed with the upper and lower inwardly turned lugs 34 and 35 adapted to engage around the edges of the member 31. Formed as part of the web 33 and projecting diagonally therefrom, as illustrated, is the platform 36 upon which the motor 37 is mounted, this motor being provided with a pulley wheel or band wheel 38 upon its shaft. The web 33 may be engaged with the vertical bar 31 in any suitable manner, as by means of a pin 39.

It will be seen that with this construction it is only necessary to tilt the motor support rotatively around the pin 39 as a center and this will disengage the lugs from their engagement with the bar 31 and then the motor support may be shifted laterally to disengage it entirely from the supporting bar 31. Disposed immediately above the upper end of the supporting bar 31 is the slide 40 which is so formed as to provide two horizontally extending, cylindrical bearing portions 41 and 42 connected by an intermediate web 43. These bearing portions 41 and 42 are longitudinally bored for the passage of rods 44 and 45. This slide is also formed with two vertical barrels 46 for the passage of vertical guide rods 48 which extend downward through these barrels 46 and pass through the vertical bores 30 formed in the arm 27, these rods being screw-threaded at their lower ends for engagement by nuts 49. The upper ends of the rods 48 are connected by means of a transversely extending bar 50. The slide 40 at its lower end carries a longitudinally extending web 51 upon which pulleys or band wheels 52 are mounted, these band wheels being disposed relatively close together. The slide is formed on a line between the two bores 46 with an interiorly screw-threaded lug 54 and engaged with this lug is an adjusting screw 53 which passes through the bar 50 and which is rotated by means of a hand wheel 55 operatively supported upon this bar. By rotating this hand wheel in one direction or the other, the screw 54 will cause the slide 40 to be raised or allowed to lower to any desired extent. The bar 31 is riveted or otherwise attached to the slide 40, as shown most clearly in Figure 2, and is longitudinally slotted to accommodate the screw 53.

The rods 44 and 45 are connected at their rear ends by means of a tie piece or rod 56, the upper end being formed to provide the split eye 57 which embraces the rod 44. The lower end of this tie rod 56 is also provided with an eye 58 which embraces the rod 45, and carried upon this tie rod at the lower end thereof and just above the rod 45 is the arbor 59 for a pulley 60. The opposite ends of the rods 44 and 45 from the tie piece 56 are connected by means of a tie piece 61 which, as illustrated, is curved in its length, the lower end of this piece 61 being provided with the eye 62 through which the end of rod 45 passes, and its upper end with the eye 63 through which the rod 44 passes, these rods 44 and 45 being provided with nuts engaging the outer faces of these eyes 62 and 63.

It will be seen that the tie piece curves upward and rearward. Mounted upon the rods 44 and 45 inward of the front tie member 61 is a saw arbor yoke. This consists of a longitudinally extending body member 64. This yoke is formed to provide the bearings 65 and 66 wherein is mounted the saw mandrel or arbor 67; the body 64 is also formed to provide two bearings 68 which are off-set with relation to the axis of bearings 65 and 66 and these bearings 68 are arranged to swingingly engage the rod 45. Mounted upon the saw mandrel 67 between the bearing 66 and the rod 45 is the pulley 69 by which the saw is driven.

For the purpose of adjusting the inclination of the saw to a horizontal plane, I mount upon the rod 44 the curved arm 71 constituting a quadrant and mount upon the yoke for supporting the saw arbor a member with which said quadrant arm 71 is adapted to slidingly engage, this member having means whereby it may be clamped at equi-distant points upon this quadrant arm 71. Preferably the quadrant arm 71 is provided with a plurality of evenly spaced perforations 71$^a$ and the quadrant-engaging device has a slot through which the quadrant passes and has a pin for engaging in these perforations. This latching member for the quadrant arm is designated 73 and is attached to the yoke for supporting the saw mandrel in any suitable manner and is formed with a slot 74 through which the quadrant 71 passes.

Mounted within the member 73 is a latching pin 75, the outer end of which is re-bent upon itself, as at 76, and extends through an aperture intersecting the slot 74. The opposite end of the pin 75 is provided with a push button 77 and disposed in a socket within the body 73 is a coiled compression spring 78 which bears against this push button and thus urges the returned end 76 into engagement with any one of the apertures or perforations in the quadrant.

It will be obvious now that by simply pushing against the button 77 that the keeper, as it may be called, 76 will be pushed out of its engagement with a perforation of the quadrant and that then the saw may be shifted into any desired angular relation to a horizontal plane and then again latched in position. This quadrant 71 is preferably graduated in degrees. Engaging the band wheels or pulleys 60 and 69, the two pulleys 52, and the driving pulley 38 is a belt 79 which passes around the driving pulley 38. This has two nearly parallel but slightly convergent flights which pass upward to the pulleys 52 and these flights then extend in opposite directions horizontally, one of the flights passing around the pulley 60 and the other flight passing around the pulley 69. This arrangement of the belting, it will be obvious, permits the carriage formed by the rods 44 and 45 and the tie rods connecting these rods 44 and 45 to be shifted through the guide bars of the spider 40, while at the same time keeping the belt at all times taut and doing away with the necessity of any belt tightener. Of course, if the belt gets slack it is possible to take up this slackness by shifting the tie rod 56 outward and then clamping it again in position.

It will likewise be seen that the saw supporting and motor supporting members can be shifted together around the axis of the turntable so as to bring the saw into any angular relation to the guide edge 11 of the table 10. By combining the two adjustments, one an adjustment in a horizontal plane and the other the angular adjustment of the saw relative to a horizontal plane, any desired form of cut may be made and the angle may be either an ordinary simple angular cut or a compound angular cut. Furthermore, it is obvious that the saw may be turned into a horizontal plane and then moved forward any desired distance for slotting or it may be disposed above a board and then moved downward by means of the adjusting screw to thus slot a horizontal board. If it be desired, a router may be mounted upon the saw mandrel by the use of a suitable chuck and routing may be readily accomplished with the mandrel in a vertical position.

The turntable 23 and the bed plate upon which the turntable rotates may be formed, one with a circular series of graduations, and the other with an index coacting with said graduations to thus permit the saw to be turned into any required angular position, and then by turning up on the nuts engaging the bolts 28 the turntable may be locked in this radially adjusted position where a good deal of work of like character is to be performed. Ordinarily, however, the turntable will have just sufficient frictional engagement with the bed plate that the turntable will stay in any position in which it is shifted and the weight of the parts supported by the turntable will hold it in its shifted position.

The graduations for the adjustment of the turntable are preferably of the character shown in Figure 8. Thus, for instance, the bed plate is shown as provided with three scales, namely an outer hip and valley scale A, an intermediate common and jack rafter scale B, and an innermost circle C which is divided by degree graduations. A still further circle of graduations could be used which would be applicable to all polygonal cuts. It will be seen from Figure 8 that the scale on the turntable is practically the same as those found upon a steel square and the figures for the hip, and valley rafters and for the jack rafters, etc., are merely transferred from the steel square into a circular form and applied to the turntable. The quadrant has the apertures in it arranged with their centers corresponding to degree marks and, of course, these apertures will be marked to indicate the several degrees so that thereby the saw may be set in any desired position from a horizontal plane to a vertical plane and any desired angle between these two planes.

While I have illustrated the quadrant arm 71 as being provided with perforations with which a latching device engages, it will be obvious that other more delicate means may be used for holding the saw mandrel in adjusted angular relation to the face of the table in case it is required that finer work should be done than is capable of being accomplished by means of the perforations in the face of the arm 71. With the arm 71, however, arranged with perforations spaced a degree apart, it is perfectly possible to make all the cuts ordinarily used by carpenters and with the necessary degree of accuracy.

The operation of this device will be obvious from what has gone before. The saw is to be set in proper angular relation to the table flange 11 and in proper angular relation to the face of the table, then the work to be accomplished is disposed upon the table 10 and the saw is pulled by means of the tie bar 61 across the table, cutting through the work, or, of course, the saw may be pushed by means of the tie rod 56. Preferably the saw will be provided with a guard over the upper portion of the saw blade though this forms no part of my invention. The saw may be adjusted higher or lower by turning the screw 53, and it will be seen that the belt will remain tight whether the saw be raised or lowered or whether the saw be shifted forward or backward, inasmuch as a forward movement of the front pulley will cause a forward movement of the rear pulley and thus, though the flights may individually vary, the total length of the flights will remain at all times the same. Of course, the belt may be tightened from time to time as it becomes slack by shifting the tie rod or tie piece 56 outward or inward on the bars 45 and 44 and this without the necessity of any belt tightener pulley.

Attention is particularly called to the fact that the plane of the saw is disposed to one side of the axial center upon which the saw adjustably oscillates, that is, the rod 45, and that in this construction the lowest portion of the saw will come flush with the face of the table when the saw is at right angles to the plane of the table and again flush with the edge of the table when the saw is at a 45° angle thereto so that in either of these positions the saw will always just touch or just escape touching the upper face of the table. When the saw is adjusted from a vertical position into an angle of 45° to the face of the table, the saw is retracted until it is beyond the back of the table, then the saw is turned upon its center into a 45° angle and then moved forward. If, however, the saw is turned to less than a 45° angle, the saw must be raised a certain extent as, for instance, a half inch for an angle of $22\frac{1}{2}''$ in order to bring the lower edge of the saw flush with the face of the table. Inasmuch as vertical and 45° cuts are used almost entirely, these two cuts, it will be seen, may be readily made without any particular adjustment.

While I have illustrated certain details of construction and arrangement of parts which I have found to be particularly effective in actual practice, I do not wish to be limited thereto as it is obvious that these details may be changed and varied in many ways without departing from the spirit of the invention as defined in the appended claims.

I claim:—

1. In a sawing machine, a reciprocating frame, a pivoted support for the frame, a member mounted upon said support for swinging movement therewith but for vertical movement independent thereof, the frame being reciprocable through said member, a pair of band wheels carried upon said last named member, means for vertically shifting said last named member upon the support, a motor operatively mounted upon the support and swung therewith, a saw mandrel mounted upon one end of the saw supporting frame and carrying a saw, a band wheel mounted upon the saw supporting frame adjacent the end opposite the mandrel, and an endless belt passing around the motor band wheel between the guide wheels and then passing in opposite directions around the band wheels on the saw supporting frame.

2. In a sawing machine, a saw supporting frame, a pivoted support for the frame, a member mounted upon said support for swinging movement therewith but for vertical movement independent thereof, the frame being reciprocatable through said member, a pair of band wheels carried upon said last named member, means for vertically shifting said last named member upon the support, a motor operatively mounted upon the member below the pivotal support for the frame and swinging with the support, a saw mandrel mounted upon one end of the saw supporting frame and carrying a saw, a band wheel mounted upon the saw supporting frame adjacent the end opposite the mandrel, an endless belt passing around the motor band wheel between the guide wheels and then passing in opposite directions around the band wheels on the saw supporting frame, the mandrel being mounted upon the saw supporting frame for swinging movement in a vertical plane whereby to adjust the mandrel into a plurality of angular relations to the face of the table.

3. In a sawing machine a table, a supporting member pivotally mounted on a vertical axis beneath the table, the pivotal axis of the member being on a line with the rear edge of the table, a vertically extending member mounted upon said supporting member for swinging movement therewith, a saw support operatively mounted upon the upper end of the last named member and extending over the table, a circular saw mounted thereon, a motor supported upon said vertical member at the lower end thereof and below the table, and operative connections between the motor and the saw mandrel.

4. In a sawing machine a table, a supporting structure pivoted below the table for swinging movement in a horizontal plane, the pivotal axis for said supporting structure approximately intersecting the rear edge of the table, a saw supporting element mounted in the structure for reciprocating movement in a plane at all times intersecting the plane of the pivotal center of said structure and in a direction transverse to the table, a power driven rotatably adjustable saw mounted on said saw supporting element, and means for vertically adjusting said element upon the supporting structure.

5. In a sawing machine a table, a supporting structure pivoted below the table for swinging movement in a horizontal plane, the pivotal axis of the supporting structure intersecting the rear edge of said table, a motor carried by the supporting structure and swinging therewith and disposed at the lower end of said structure, a saw supporting element mounted at the upper end of said structure above said table for reciprocating movement in a plane intersecting the plane of the pivotal center of said structure, a saw mounted upon the saw supporting element, means for vertically adjusting said element, and an operative connection between said motor and saw.

6. In a sawing machine a table, a supporting structure pivoted below the table for swinging movement in a horizontal plane, the pivotal axis of the supporting structure intersecting the rear edge of the table, a saw supporting element mounted on said structure above the plane of the table for reciprocation across the table in a plane intersecting the axis of the supporting structure, a rotatably adjustable saw mounted on said saw supporting element including a mandrel having a band wheel, a motor carried upon said supporting structure below the table and swinging with the supporting structure, an endless belt affording a driving connection between the motor and the band wheel on the saw mandrel, guide pulleys over which said belt passes, and means for vertically adjusting the saw supporting element upon the supporting structure.

7. In a sawing machine of the character described, a supporting member having upper and lower horizontally disposed guides, a frame including parallel rods extending through said guides, means connecting the ends of said rods, a saw mandrel mounted upon one of said rods for oscillation around said rod to thereby secure adjustment into a horizontal plane, a vertical plane, or in an intermediate plane, and motor operated means for driving said saw mandrel.

8. In a sawing machine of the character described, a supporting member having upper and lower horizontally disposed guides, a frame including parallel rods extending through said guides, means connecting the ends of said rods, a yoke mounted upon the lower rod of the supporting frame for swinging movement around the rod as an axis, an arcuate quadrant mounted upon the upper rod, a guide carried by said yoke and through which the quadrant passes, said guide having means for engaging it with the quadrant at any desired point whereby the yoke may be oscillated to carry the saw mandrel into or out of parallel or angular relation to a horizontal plane, the quadrant being provided with a scale indicating the degree of adjustment of said yoke and mandrel.

9. In a sawing machine, a table, a vertical supporting bar having a horizontal platform at its lower end, the supporting bar being mounted for swinging movement in a horizontal plane, a motor mounted upon the platform, a member mounted upon said supporting bar and adjustable vertically and having a pair of parallel horizontal guides, parallel rods extending through said guides, members connecting said rods at their opposite ends, a yoke oscillatably mounted upon the lowermost rod and carrying a saw mandrel, whereby said saw mandrel may be adjusted into parallel or angular relation to the face of the table, means for vertically adjusting the support, and means for transmitting motion from the motor to said saw mandrel.

10. In a sawing machine, a table, a vertical supporting bar having a horizontal platform at its lower end, the support being mounted for pivotal swinging movement in a horizontal plane, a motor mounted upon the platform, a member mounted upon said support and adjustable vertically and having a pair of parallel horizontal guides, parallel rods extending through said guides, members connecting said rods at their opposite ends, a yoke oscillatably mounted upon the lowermost rod and carrying a saw mandrel, means whereby said saw mandrel may be adjusted into parallel or angular relation to the face of the table, means for vertically adjusting the support, a guide member mounted thereon, means for transmitting motion from the motor to said saw mandrel including a band wheel mounted upon the saw mandrel, a band wheel mounted upon the opposite end of the lowermost rod, a pair of band wheels mounted upon said member through which the rods pass, a band wheel operated by the motor, and a band passing over said last named band wheel between and over the pair of band wheels and then laterally and over the band wheels on the opposite ends of said rod.

11. In a sawing machine, a table, an arm operatively supported below the table for swinging movement in a horizontal plane, vertical guide rods carried upon the end of the arm, a member having vertical bores through which the guide rods pass and vertically adjustable upon said guide rods, a bar attached to said member and extending downward therefrom below said arm, a motor supported thereon, a saw supporting frame including a pair of parallel rods extending through said member and reciprocatable therein, the rods being connected at their opposite ends, a saw supported mandrel upon one of said rods for rotation in a vertical plane from or into a position parallel to the face of the table, and means for transmitting motion from the motor to said saw mandrel.

12. In a sawing machine, a table, a bed plate mounted below the table, a turntable operatively supported upon the bed plate for rotation in a horizontal plane, an arm attached to the turntable and extending out beyond the bed plate and carrying vertical guides connected at their upper ends, a sliding member mounted upon said guides for vertical sliding movement, means whereby said sliding member may be vertically adjusted upon the guides, a pair of rods extending through said guides in parallel horizontal planes and connected at their opposite ends, a saw mandrel support mounted upon one of said rods for swinging movement in a vertical plane, a saw mandrel carried thereby and movable therewith into or out of a plane parallel to the face of the table, means for adjusting said saw mandrel support including a quadrant having graduations, a motor support carried by said vertically slidable member and vertically movable therewith, said motor support comprising a downwardly extending bar extending below said arm, a motor platform detachably mounted upon the lower end of said bar, a motor thereon, and means operatively connecting said motor to the saw mandrel in all positions of the sliding frame and of the saw mandrel.

In testimony whereof I hereunto affix my signature.

ARTHUR MANSFIELD.